United States Patent [19]

Nakai et al.

[11] 4,378,515
[45] Mar. 29, 1983

[54] DISCHARGE LAMP LIGHTING DEVICE FOR COPYING MACHINES

[75] Inventors: Kenichi Nakai, Kadoma; Yoshiaki Ashida, Himeji; Tsuguhito Hashimoto, Himeji; Kenichi Onoe, Himeji, all of Japan

[73] Assignee: Matsushita Electric Works, Ltd., Osaka, Japan

[21] Appl. No.: 170,662

[22] PCT Filed: Mar. 16, 1979

[86] PCT No.: PCT/JP79/00066
§ 371 Date: Nov. 18, 1979
§ 102(e) Date: Nov. 9, 1979

[87] PCT Pub. No.: WO79/00793
PCT Pub. Date: Oct. 18, 1979

[30] Foreign Application Priority Data

Mar. 18, 1978 [JP] Japan .................................. 53-31486

[51] Int. Cl.$^3$ .............................................. H05B 41/16
[52] U.S. Cl. ..................................... 315/290; 315/239; 315/276; 315/DIG. 5
[58] Field of Search .................... 315/227 R, 246, 276, 315/289, 290, DIG. 5, 239; 355/69

[56] References Cited

U.S. PATENT DOCUMENTS 3,069,597 12/1962 Feinberg ...................... 315/DIG. 5
3,371,245 2/1968 Hume .............................. 315/227 X
3,903,452 9/1975 Nakai et al. ..................... 315/276 X

FOREIGN PATENT DOCUMENTS 52-44080 4/1977 Japan .................................... 315/289
1086186 10/1967 United Kingdom ......... 315/DIG. 5

Primary Examiner—Eugene R. LaRoche
Attorney, Agent, or Firm—Burns, Doane, Swecker & Mathis

[57] ABSTRACT

This discharge lamp lighting device for copying machines is used, for example, for lighting a discharge lamp for electrostatic copying machines of a type in which is reflected light from objects to be copied as irradiated sequentially with a moving light source is recorded on a rotary electrostatic drum. In this lighting device, the lamp current flowed to the discharge lamp is made substantially to be of a rectangular wave form and the substantial non-light emitting section is removed or reduced in the light output wave form of the discharge lamp, whereby an excellent copying result is made to be obtained particularly in such copying machine in which the light irradiation is momentary as referred to in the above.

1 Claim, 10 Drawing Figures

DISCHARGE LAMP LIGHTING DEVICE FOR COPYING MACHINES

TECHNICAL FIELD

This invention relates to discharge lamp lighting devices for copying machines. More particularly, it relates to a discharge lamp lighting device for copying machine wherein, in an electrostatic copying machine of a type in which, for example, a reflected light from objects to be copied as irradiated in turn with a light source moving with a slit of a width of about 5 mm. to diaphragm its flux of light is recorded on a rotary electrostatic drum, a light output of the discharge lamp which is the light source is made optimum to apply to such electrostatic copying machine.

In this discharge lamp lighting device for copying machines, the lamp current to be flowed to the discharge lamp is set to be of substantially rectangular waves so that the light output of the light source will be substantially constant at any timing of each half cycle of an alternating current source voltage and, particularly in the case of using it in the electrostatic copying machine in which the light irradiation on the object to be copied is momentary, a favorable copying result will be able to be always expected.

BACKGROUND ART

Conventionally, for generally known discharge lamp lighting device for electrostatic copying machines, there has been one, as shown, for example, in FIG. 1, which is started by an application of a secondary voltage (for example, of 150 volts) of a leakage autotransformer $T_1$ to a filament preheating type fluorescent lamp $L_1$ which is a light source through a phase advancing capacitor $C_1$ by closing a switch $S_1$. However, according to such conventonal type, there is a possibility that, as its discharge circuit forms a phase advancing circuit, the light output wave form will be disturbed and the period in which the light output of the fluorescent lamp exceeds a required level L will be so short that, in the period in which the light output is not sufficient, the copying will not be made normal (see FIG. 2A). More specifically, in the period in which the light is not sufficiently provided, the irradiated amount of light on the object to be copied will be so small that, even if the object is white, it will be discriminated to be black and no fidelity copying will be made any more.

Such problem is not limited only to the above described typical conventional lighting device but also exists in the case of obtaining a light output wave form substantially of a sine wave form by lighting the discharge lamp with a use of, for example, a choke coil type stabilizer. That is, in this case, too, the period in which the light output of the fluorescent lamp exceeds the required level L will be so short that there will be the same problem as described above (see FIG. 2B) and, in these cases, an elevation of the absolute value of light amount of the discharge lamp to some extent does not result in a fundamental solution of the problem.

Referring again to the above described problem in the discharge lamp lighting circuit of FIG. 1 shown as a typical conventional example, a lamp current of about 0.8 A. flows through the fluorescent lamp $L_1$ after it is lighted, the lamp voltage of the fluorescent lamp in this case is about 40 volts, so that the ratio of the secondary voltage $V_2$ of the transformer required for starting this lamp to the lamp voltage $V_{La}$ will be $V_2/V_{La} \approx 3.8$, wherein $\approx$ means "substantially equals". Thus, the value of $V_2/V_{La}$ in the general discharge lamp lighting devices for copying machines shows a value generally considerably larger than the value of about 2.0 of general illumination stabilizers for starting general illumination lamps which are improved for easy starting. Here, the stabilizers generally high in this value of $V_2/V_{La}$ are preferable since fluctuations in the lamp current with respect to fluctuations in the source voltage are low but, on the other hand, in the case of forming a phase advancing circuit, the wave form of the lamp current will deteriorate so that the light output wave form of the lamp will also deteriorate. As has been described above, in the case of the stabilizer of the mere choke coil type as shown in FIG. 2B, a lamp current substantially of a sine wave form can be obtained, whereas, in such stabilizer of the phase advancing type as in the above described typical conventional example, time sections in which substantially no light is emitted will exist during about one half of the current source voltage. When the frequence of such non-light emitting time is represented by an expression of form factor (=effective value/mean value):

Form factor f of single choke coil type stabilizer ... $f \approx 1.12$

Form factor f of phase advancing type stabilizer (shown in FIG. 1) ... $f \approx 1.20$ Thus, it is understood that, even if the effective value of the lamp current is 0.8 A. in each, the light amount in the latter case will be smaller by more than several % than in the case of the former and much more sections of non-light emission exist. It should be additionally referred to that, in the former case, the light output is satisfactory at the minimum but the fluctuation characteristics of the current source voltage are poor and involve certain problem in practice.

Now, in order to accelerate an understanding of the present invention to be disclosed later, references shall be made here to the characteristics of the fluorescent lamp which has been used as the light source of the electrostatic copying machines of the kind referred to. In the most general fluorescent lamp (FLR 30) for the copying machines, a predetermined light output is obtained by flowing a lamp current (0.8 A.) which is about 1.5 times as large as that of such general illumination fluorescent lamp as, for example, of FL 30 (of a lamp current of 0.6 A.), so that a difference will naturally exist in respect to the ambient temperature characteristics from the general illumination fluorescent lamps. This difference is shown in FIG. 3 in which, in the case of FL 30 as an example of the general illumination fluorescent lamps, the maximum flux of light is provided as shown by the solid line in the drawing when the ambient temperature is about 20° C. but, on the other hand, in the case of FLR 30 as an example of the flourescent lamps for the copying machines, the value of the maximum flux of light is present adjacent 5° C. as shown by the broken line in the drawing and, at a temperature higher than it, the flux of light steadily reduces. This is due to that not only the lamp current is large as described above but also the tube diameter of the fluorescent lamp is 25$\phi$ for the copying machines while the tube diameter of the general fluorescent lamps is 38$\phi$ so that the current density will be three times as high as that of the general ones, whereby the interior of the copying machines is made unexpectedly high in the temperature and the ambient temperature of the lamp often reaches 80° C. Even if it is attempted, therefore, to increase the light output by further increasing the current in anticipation of it, no sufficient light output will be obtained. These circumstances are shown in FIG. 4, that is, as shown by the solid line in the drawing, the light output increases with the increase in the current in the general fluorescent lamps but, in the fluorescent lamps for the copying machines, any increase in the light output will be canceled by reductions in the lamp efficiency so as to be substantially constant even if the current is increased, as shown by the broken line, so that no increase can be expected at all in the light output even with the increase of the current. It may be possible to consider an improvement of the current density in order to increase the light output of the fluorescent lamp for the copying machines under such circumstances. As a measure for performing such improvement, however, a selection must be made either from an enlargement of the tube diameter of the lamp or a reduction of the lamp current, but either one can hardly be adopted since, with the former, the device must become larger in size and, with the latter, the absolute value of the light amount will be reduced.

In the general conventional discharge lamp lighting devices for copying machines, as has been disclosed in the foregoings, there have been defects that, though it is set to flow a larger current to the lamp than in the general illumination fluorescent lamp lighting devices in order to obtain a larger light amount, the high temperature characteristics are not preferable due to the relation to the tube diameter of the lamp and, in the case of using a stabilizer in which a phase advancing discharge circuit compensating for fluctuations in the current source voltage is formed, the ratio of $V_2/V_{La}$ will be generally large due to the relation to the lamp starting voltage and many non-light emitting sections will exist in the lamp current wave form. In the device of FIG. 1 shown as a typical conventional system, it is seen that the current wave form will be as shown in FIG. 2A so that the peak value of the lamp current will become extremely high and the lamp life will be made short, and further that this large current point will be short in the time, substantially no current will contribute to the copying function and the current is flowed wastefully.

Further, it is of course possible to employ such quite distinctive lighting systems as follows in order to avoid these defects of the exemplified conventional devices:

(a) Direct current lighting,
(b) High frequency lighting, and
(c) Flickerless circuit formation.

In the system of (a), first, there is a difficulty that a difference in the brightness exists between the cathode and anode of the lamp. That is, the difficulty is present due to a Faraday dark space existing on the cathode side to render the brightness different between the cathode and anode, whereby the entire length of the light source can not be utilized. In the system of (b), next, the lamp is lighted by high frequency waves so that there will be no non-light emitting section of the lamp but the device is costly. In the system of (c), finally, two lamps must be provided to be lighted alternately, so that the cost becomes high and, further, there is a difficulty in the fluctuation characteristics of the current source voltage on the phase delaying side fluorescent lamp. The present invention is not to solve such technical problems as have been disclosed by means of any system different from such generally adopted conventional systems as these, but is to dissolve the various problems by improving the above described general conventional systems.

DISCLOSURE OF INVENTION

A primary object of the present invention is, therefore, to provide a discharge lamp lighting device for copying machines which is capable of obtaining favorable copying results.

Another object of the present invention is to provide a discharge lamp lighting device for copying machines wherein a stabilizer element can be made small, light and economical.

According to the present invention, the above described objects are attained by providing a stabilizer element which sets the wave form of the lamp current flowed to such discharge lamp as a fluorescent lamp substantially to be rectangular to thereby reduce non-light emitting sections in the light output wave form of the lamp.

The discharge lamp lighting device for copying machines of the present invention shall be further explained in the followings with reference to accompanying drawings.

FIG. 5 is an electric circuit diagram showing an embodiment of the invention, in which a stabilizer 2 is formed of a leakage autotransformer T, a phase advancing capacitor C and a starter ST, which are stabilizer elements. This leakage autotransformer T has the secondary voltage made lower than 100 volts, preferably 70 to 80 volts (in the case when used fluorescent lamp is FLR 30), for a source voltage of 100 volts so that the ratio $V_2/V_{La}$ of the secondary voltage $V_2$ to the lamp voltage $V_{La}$ will be set to be about 2, and further a so-called bridge gap is formed within the magnetic path of the secondary side core of the transformer so that the lamp current wave form will be approximated to a rectangular wave. The starter ST is formed by connecting a series circuit of a capacitor $C_2$ and a silicon symmetrical switch SSS between one end of the secondary winding of the leakage autotransformer T and an intermediate tap and also connecting the middle point of this series circuit to one end of a fluorescent lamp 1 through a resistance R. A switch S for lighting the fluorescent lamp on and off is connected at one end to an end of the fluorescent lamp 1 and at the other end to an end of an alternating current source E connected to the primary winding of the leakage autotransformer T. Irrespective of the opened or closed state of the switch S for the lighting on and off, the fluorescent lamp 1 is caused to be always preheated by a heating voltage for filaments $H_1$ and $H_2$ induced in heating windings $f_1$ and $f_2$ by the alternating current source E. The fluorescent lamp 1 is then caused to be lighted on by closing the switch S. Referring to this manner in comparison with the before described typical conventional example (shown in FIG. 1), while in the case of the exemplified conventional circuit the fluorescent lamp $L_1$ is momentarily lighted on when a secondary voltage $V_2$ of about 150 volts is applied to the fluorescent lamp $L_1$, in the embodiment of the present invention, the fluorescent lamp 1 is not started only with the secondary voltage $V_2$ since this secondary voltage $V_2$ is set to be lower than 100 volts as described above. However, the capacitor $C_2$ will be charged by means of a closed circuit of the capacitor $C_2$ and resistance R of the starter ST and the switch S for the lighting on and off, this charging voltage will reach a breakover voltage $V_{BO}$ of the silicon symmetrical switch element SSS, then the element SSS will be ignited, and the charge of the capacitor $C_2$ will be discharged to a closed circuit formed of the capacitor $C_2$, the element SSS and a part n of the secondary winding of the leakage autotransformer T. With this discharge current, a high voltage corresponding to the winding ratio with respect to the part n of the secondary winding will be generated in the secondary winding of the transformer T and will be superposed on the secondary voltage $V_2$. Thus, a circuit of the phase advancing capacitor C, fluorescent lamp 1 and switch S for the lighting on and off is formed, the high voltage is applied to the fluorescent lamp 1 to start it, the lighted state thereof is reached, and a lamp current approximating a rectangular wave as shown in FIG. 6 will flow through the fluorescent lamp 1. That is, such light output wave form (f, f=1.08) as shown in the drawing will be eventually obtained. Further, it will be advantageous to have the operation of the starter ST stopped by utilizing the reduction of the lamp voltage after the fluorescent lamp 1 is lighted on. In this embodiment of the present invention, the secondary voltage of the stabilizer elements is so low as to be unable to start the fluorescent lamp 1 so that there will be no problem, whereas in the case where this secondary voltage is set to be somewhat higher there is a possibility that a slight discharge will remain in the lamp and the lamp will be reignited. According to the embodiment of the present invention, however, the series circuit of the phase advancing capacitor C, capacitor $C_2$ and resistance R is connected in parallel with the fluorescent lamp 1 so that, at the moment when the fluorescent lamp 1 is about to be reignited, the reigniting voltage will be absorbed by the series circuit and the fluorescent lamp will be positively prevented from being reignited.

Referring here to various characteristics of the embodiment described above of the present invention, the current source voltage is varied to be 90 to 100% after the fluorescent lamp is lighted on so that the light output (brightness) variation will be as shown in FIG. 7, wherein light output variations will be ±3% for voltage variations of ±10%, and a very excellent constant light output characteristics will be provided. The lamp current (light output) wave form at this time will be of a rounded one with the 90% voltage, will be of a composition of two ridges with a rated voltage of 100% voltage, and will be rather deep in the valley with 110% voltage, as shown in FIG. 8. In each wave form, however, it is understood that there exists substantially no time total in which the wave form becomes below a level A of a certain light output and, according to the embodiment of the present invention, the current source voltage fluctuation characteristics are favorable. Further, it is also understood that the wave forms of the embodiment of this invention are most approximate to that of the rectangular wave as compared with the conventional ones shown in FIGS. 2A and 2B so that the same light output can be obtained with the low current value. That is, if the rated lamp current (0.8 A.) is passed in any lighting devices, the form factor is the effective value/mean value and the light output (brightness) is considered to be approximately this mean value, the above understandings will be found to be correct, so along as confirmed in comparison of the respective form factors (f, f) with each other.

The following table is provided to show the comparisons of the form factors in the respective cases. In the table, the wave form shown in FIG. 2B is made a standard of 100% for others.

| Case | Form Factor | Calculated Value | Measured Value |
|---|---|---|---|
| FIG. 2A | 1.20 | 92.5% | 90.5% |
| FIG. 2B | 1.12 | 100% | 100% |
| FIG. 6 | 1.08 | 103.8% | 104% |

Another embodiment of the present invention is shown in FIG. 9. In this embodiment, a stabilizer 3 is formed in such that a discharge lamp 4 is connected to an alternating current source $E_1$ through a series circuit of a choke coil $L_2$ and a phase advancing capacitor $C_3$, and a saturable choke coil $L_3$ is connected in parallel with the discharge lamp 4 through the phase advancing capacitor $C_3$. The ratio of the secondary voltage $V_2$ applied to the discharge lamp 4 to the lamp voltage $V_{La}$ is made less than about 2 and the form factor f, f is made 1, 1, so that a lamp current substantially of a rectangular wave can be made to flow.

While in the respective embodiments of the present invention, further, a lighting circuit of one lamp is formed, the idea of the present invention is of course not to be limited to this but can be also realized similarly in multi-lamp series lighting circuits.

Thus, in the discharge lamp lighting device for copying machines according to the present invention, the lamp current to be flowed to the discharge lamp is set to be substantially of a rectangular wave form and the substantial non-light emitting section is rendered not to exist at all or to be minimum in the light output wave form, whereby a most excellent copying result can be obtained when applied to the electrostatic copying machines in which the light irradiation timing for copying is momentary and, on the other hand, the temperature characteristics can be improved by the possibility of reducing the lamp current by the amount of the increase in the light output. Further, with the provision of the phase advancing lighting circuit, the excellent copying result can be always obtained without impairing the constant light output even with respect to the fluctuations in the source voltage and the secondary voltage can be reduced with the ratio of the secondary voltage $V_2$ to the lamp voltage $V_{La}$ set to be about 2, whereby the stabilizer elements can be minimized in size and weight and the manufacturing cost can be lowered.

BEST MODE FOR WORKING THE INVENTION

Figure 1:
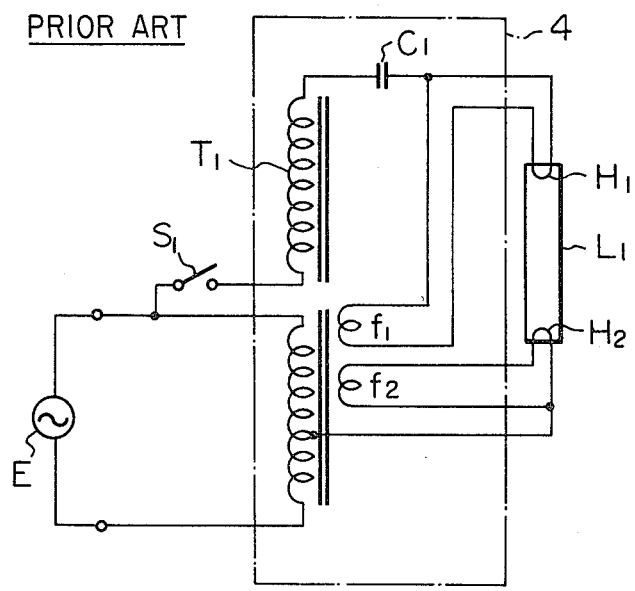
FIG. 1 is an electric circuit diagram of a discharge lamp lighting device using a conventional phase advancing type stabilizer.
Figure 2A:
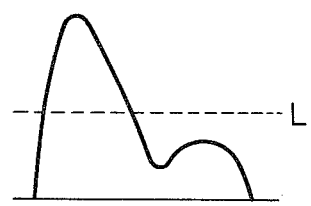
FIG. 2A is a wave form diagram of the light output of the same in FIG. 1.
Figure 2B:
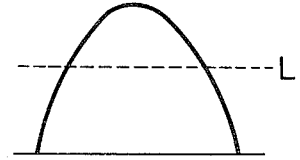
FIG. 2B is a wave form diagram of the light output of a discharge lamp lighting device using a conventional choke coil type stabilizer.
Figure 3:
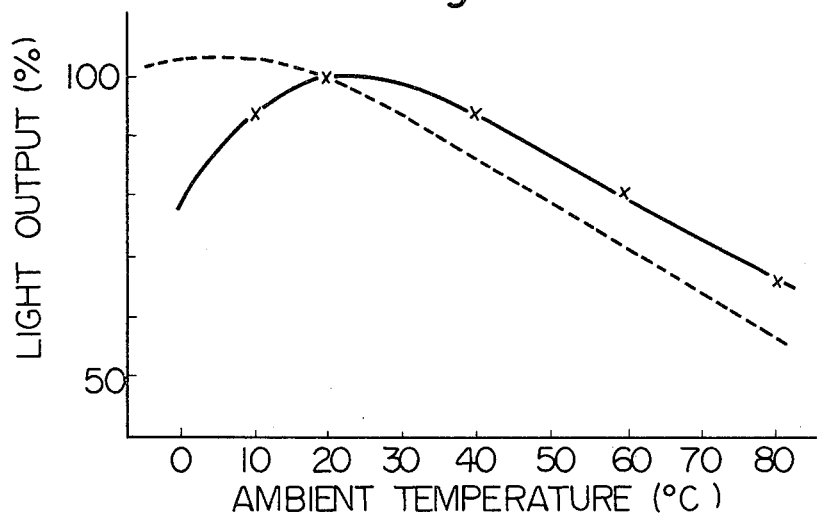
FIG. 3 is a diagram for explaining light output and ambient temperature characteristics of a flourescent lamp for general illumination and of a fluorescent lamp for copying machines.
Figure 4:
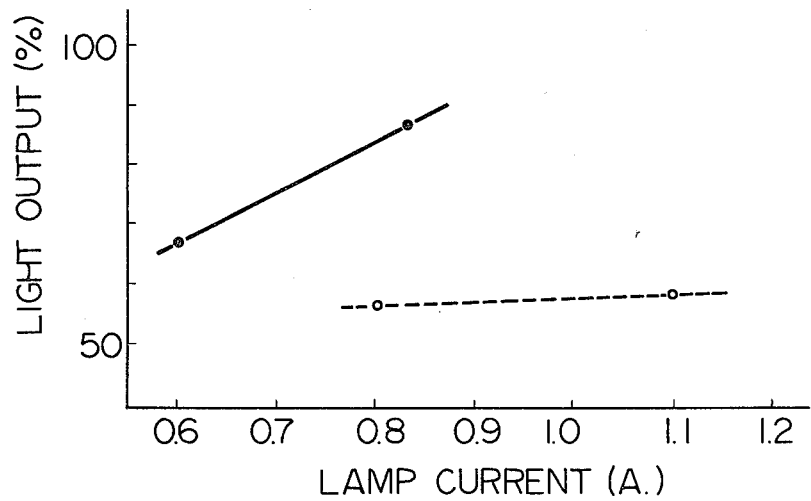
FIG. 4 is a diagram for explaining lamp current and light output characteristics of the fluorescent lamps as above.
Figure 5:
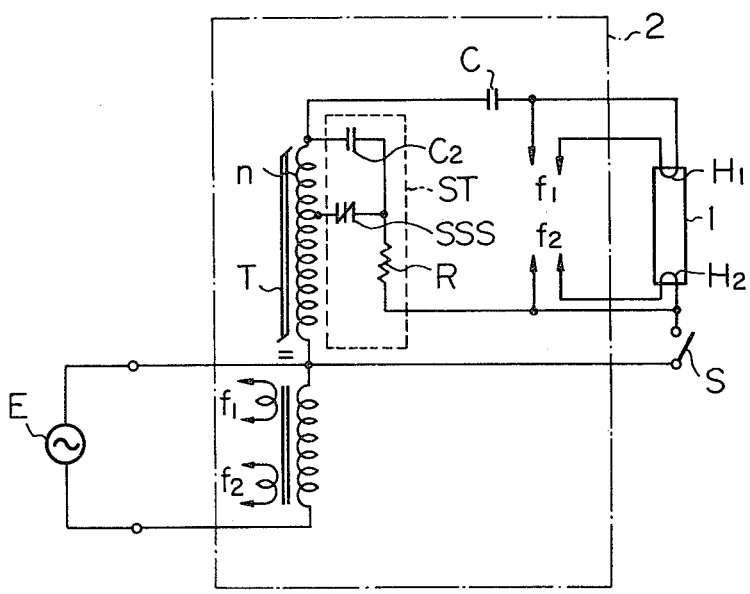
FIG. 5 is an electric circuit diagram of an embodiment of the present invention.
Figure 6:
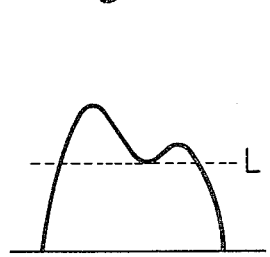
FIG. 6 is a wave form diagram of the light output of the above.
Figure 7:
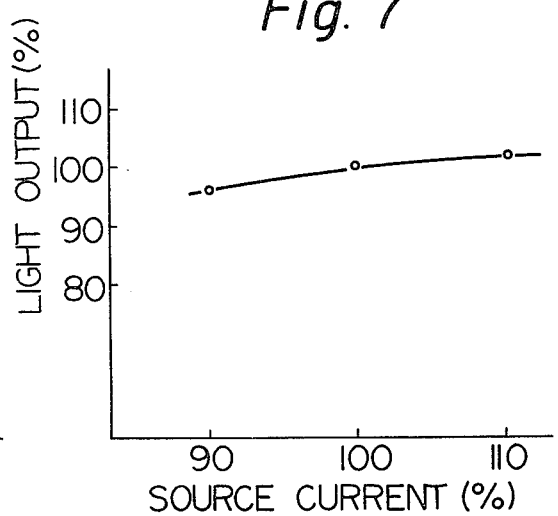
FIG. 7 is a wave form diagram of the light output dependent on fluctuations in the source voltage of the above.
Figure 8:
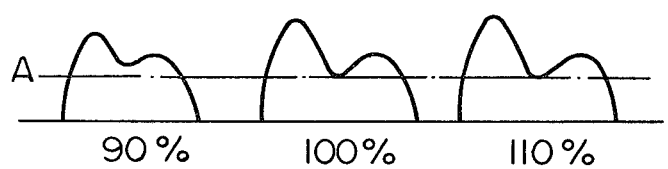
FIG. 8 is a wave form diagram of the light output of the above for explaining it in comparison with the exemplified conventional devices.
Figure 9:
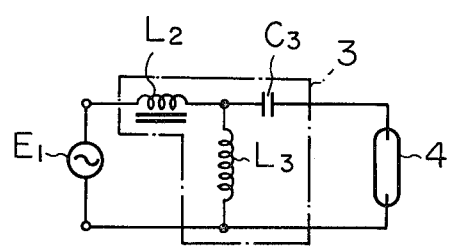
FIG. 9 is an electric circuit diagram showing another embodiment of the present invention.

An arrangement in which a stabilizer 2 comprises a leakage autotransformer T, phase advancing capacitor C and starter ST, said leakage autotransformer inducing a secondary voltage of 70 to 80 volts, the ratio of which secondary voltage to a lamp voltage $V_{La}$ of a fluorescent lamp 1 of FLR 30 is set to be about 2 and being provided with a bridge gap within a magnetic path of the secondary side core of the autotransformer to obtain a lamp current substantially of a rectangular wave, said starter ST being formed by connecting a series circuit of the capacitor C and a silicon symmetrical switch SSS between one end of the secondary winding of the leakage autotransformer T and an intermediate tap and also connecting the middle point of this series circuit to one end of the fluorescent lamp 1 through a resistance R, and a switch S for lighting the fluorescent lamp on and off is connected at one end to an end of the fluorescent lamp and at the other end to an end of an alternating current source E connected to the primary winding of the leakage autotransformer T.

We claim:

1. Discharge lamp lighting apparatus for copying machines comprising alternating current source means; discharge lamp means; stabilizer means forming a phase advancing circuit for producing a secondary voltage which is substantially twice the lamp voltage of said lamp means when said lamp means is lighted and for producing a lamp current from said alternating current source means having a rectangular waveform with a form factor of less than 1.11, said stabilizer means comprising the secondary winding of a discharge transformer connected to said alternating current source means, a phase advancing capacitor connected in series with said discharge transformer secondary winding and said lamp means, and starter means connected in parallel with said lamp means; said starter means comprising voltage responsive switch means and a part of said secondary winding connected in series with each other and in parallel with a further capacitor of a series circuit comprising a resistance connected to said lamp means and said further capacitor; said discharge lamp lighting apparatus further comprising switch means for connecting said lamp current to said lamp means to light said lamp means on and off.

* * * * *